United States Patent
Yamaji et al.

(10) Patent No.: US 8,351,225 B2
(45) Date of Patent: Jan. 8, 2013

(54) SYSTEM-INTERCONNECTED INVERTER

(75) Inventors: Takeshi Yamaji, Wako (JP); Takayuki Enomoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 480 days.

(21) Appl. No.: 12/754,116

(22) Filed: Apr. 5, 2010

(65) Prior Publication Data

US 2010/0254169 A1    Oct. 7, 2010

(30) Foreign Application Priority Data

Apr. 6, 2009 (JP) ................................ 2009-092457

(51) Int. Cl.
    *H02M 7/537*    (2006.01)
(52) U.S. Cl. .......................................... 363/40; 307/68
(58) Field of Classification Search .................... 363/40; 307/64, 68
    See application file for complete search history.

(56) References Cited

U.S. PATENT DOCUMENTS

| 5,220,276 A | * | 6/1993 | Kleefstra | 324/103 P |
| 5,363,020 A | * | 11/1994 | Chen et al. | 315/209 R |
| 6,501,196 B1 | * | 12/2002 | Lo | 307/125 |
| 7,355,356 B2 | * | 4/2008 | Mudra | 315/307 |

FOREIGN PATENT DOCUMENTS

| JP | 07-143758 |   | 6/1995 |
| JP | 08223823 A | * | 8/1996 |
| JP | 8-308249 |   | 11/1996 |

* cited by examiner

*Primary Examiner* — Harry Behm
(74) *Attorney, Agent, or Firm* — Rankin, Hill & Clark LLP

(57) ABSTRACT

A system-interconnected inverter connected to a commercial system for supplying AC power, which inverter includes a switching device for turning on and off DC power based on a predetermined duty value to output a voltage whose frequency is the same as that of a system power source and a controller for controlling the switching device. The controller changes the duty value of the switching device in accordance with the value obtained by dividing the maximum value by the effective value of the output current from the switching device measured with the system-interconnected inverter disconnected from the system power source.

2 Claims, 7 Drawing Sheets

SYSTEM-INTERCONNECTED INVERTER

FIELD OF THE INVENTION

The present invention relates to a system-interconnected inverter connected to a commercial system for supplying AC power.

BACKGROUND OF THE INVENTION

In general, an inverter connected to a commercial system for supplying AC power is called a system-interconnected inverter. The system-interconnected inverter supplies generated electric power to a connected AC load in cooperation with a commercial power supply or any other commercial system.

A system-interconnected inverter can also perform a backup operation as an electric generator when disconnected from a system in the event of a power outage or any other similar situation. When a capacitor-filtered diode bridge rectifier load (hereinafter simply referred to as a rectifier load) is connected, however, it is known that the waveform of the voltage outputted from the rectifier load suffers from harmonic distortion.

To reduce the harmonic distortion described above, a known conventional power supply apparatus switches between conduction/non-conduction of a rectifier device by comparing the voltage across a smoothing capacitor with the voltage which is outputted from rectifying means and on which a high-frequency AC voltage is superimposed, and conducts an input current from an AC power supply substantially all over one cycle of the AC voltage from the AC power supply so that there is no period during which the input current is not conducted (see, for example, Japanese Patent Application Laid-Open Publication No. H07-143758).

To reduce harmonic distortion and ripple voltage, another known power supply apparatus includes a charger that accumulates energy from a DC power supply, superimposes the accumulated energy on the output from the DC power supply, and discharges the resultant energy to each capacitor (see Japanese Patent Application Laid-Open Publication No. H08-308249, for example).

Each of the power supply apparatus disclosed in the H07-143758 publication and the H08-308249 publication, however, operates as a power supply apparatus alone but does not operate in connection with, for example, a commercial system, like a system-interconnected inverter.

As described above, when a system-interconnected inverter connected to a rectifier load performs backup operation, the output voltage waveform suffers from harmonic distortion. In general, an LC filter that forms the output stage of a system-interconnected inverter has a cutoff frequency fc as small as possible to the extent that the output frequency is not adversely affected. Harmonic components of the output from the system-interconnected inverter can thus be efficiently reduced.

Further, at the time of system interconnection, increasing the capacitance C of the LC filter increases a reactive current flowing through the capacitance C. To maintain a high power factor, it is necessary to cancel the reactive current flowing through the capacitance C. To this end, the capacitance C is desirably small.

In view of this fact, the LC filter is designed in such a way that the capacitance C has a smallest possible value and the inductance L has a large value at the time of system interconnection. When the capacitance C is small, it is difficult to follow instantaneous variation in load, which causes no problem when the system normally operates because any power shortage is compensated from the system power source.

At the time of the backup operation described above, the system-interconnected inverter operates as an electric generator, and the output current is not controllable but depends on the connected load because there is no reference voltage from the system power source at the time of backup operation.

The capacitance C of the LC filter is also desirably small for the same reason relating to system interconnection but requires an appropriate magnitude in accordance with the output from the electric generator and an intended load, since it is necessary to follow abrupt variation in load in order to operate the system-interconnected inverter as an electric generator.

FIG. 9 hereof shows the ranges of an LC filter constant required at the time of system interconnection and backup operation when the system-interconnected inverter operates as an electric generator alone. In FIG. 9, the character b denotes the range of the LC filter constant at the time of system interconnection, and the character c denotes the range of the LC filter constant at the time of backup operation. As shown in FIG. 9, the LC filter constant a (cutoff frequency) required at the time of system interconnection differs from that at the time of backup operation.

When a system-interconnected inverter operates at the time of backup operation, optimum inductance L and capacitance C cannot be used. It is therefore expected that the output voltage oscillates when the load abruptly varies and hence harmonic distortion of the output voltage worsens.

FIG. 10 shows measured harmonic distortion obtained when the LC filter constant is optimized not to worsen the harmonic distortion of the output current from the system-interconnected inverter described above interconnected with a system and the system-interconnected inverter is operated under that condition as an electric generator for backup operation. FIG. 10 hereof shows total harmonic distortion at an output voltage rating obtained when a resistance R load, an inductance L load, a capacitance C load, or a rectifier load is connected.

In FIG. 10, comparing the harmonic distortion [%] of the output voltage produced when the resistance R load, the inductance L load, or the capacitance C load is connected with the voltage produced when the rectifier load is connected indicates that the harmonic distortion produced when the rectifier load is connected is significantly large; i.e., 13.9%.

FIG. 11 hereof shows measured harmonic distortion components of various orders at the output voltage rating produced when the rectifier load is connected.

As indicated in FIG. 11, the harmonic distortion components for odd orders are large, and the harmonic distortion components for the third, fifth, eleventh, and thirteenth orders are particularly large.

SUMMARY OF THE INVENTION

It is an object of the present invention to provide a technique for reducing the harmonic distortion of the output voltage produced when a rectifier load is connected in the system-interconnected inverter described above.

According to the present invention, there is provided an inverter interconnected with a system power source for outputting AC power, which inverter comprises: switching means for turning on and off DC power based on a predetermined duty value and outputting a voltage whose frequency is the same as that of the system power source; and control means for controlling the switching means. The control means changes the duty value of the switching means in accordance with the value obtained by dividing the maximum value by the effective value of the output current from the switching means measured with the system-interconnected inverter disconnected from the system power source.

As described above, the control means according to the present invention changes the duty value of the switching means in accordance with the value obtained by dividing the maximum value by the effective value of the output current from the switching means measured with the system-interconnected inverter disconnected from the system power source. The harmonic distortion of the output voltage can thus be reduced.

It is preferred that when the value obtained by dividing the maximum value by the effective value of the output current from the switching means exceeds a predetermined value indicating that connection of a load that produces a harmonic distortion whose magnitude is substantially unacceptable in terms of output waveform, the control means sets the duty value of the switching means at a value lower than the value used when the system-interconnected inverter is connected to the system power source. It is therefore possible to perform PWM switching control that reduces a resonant current causing harmonic distortion.

It is also preferred that the control means produces the opposite-phase component of an odd-order distortion component of the harmonic distortion contained in the waveform of the output voltage from the switching means, superimposes the opposite-phase component on the output voltage from the switching means, and performs feedback control so that the output voltage approaches a sinusoidal waveform. The resulting feedback control allows a square waveform containing the odd-order harmonic component, which appears when a rectifier load is connected and causes the crest of the output voltage to be flat, to approach a sinusoidal waveform, whereby the harmonic distortion of the odd-order distortion component can be reduced.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
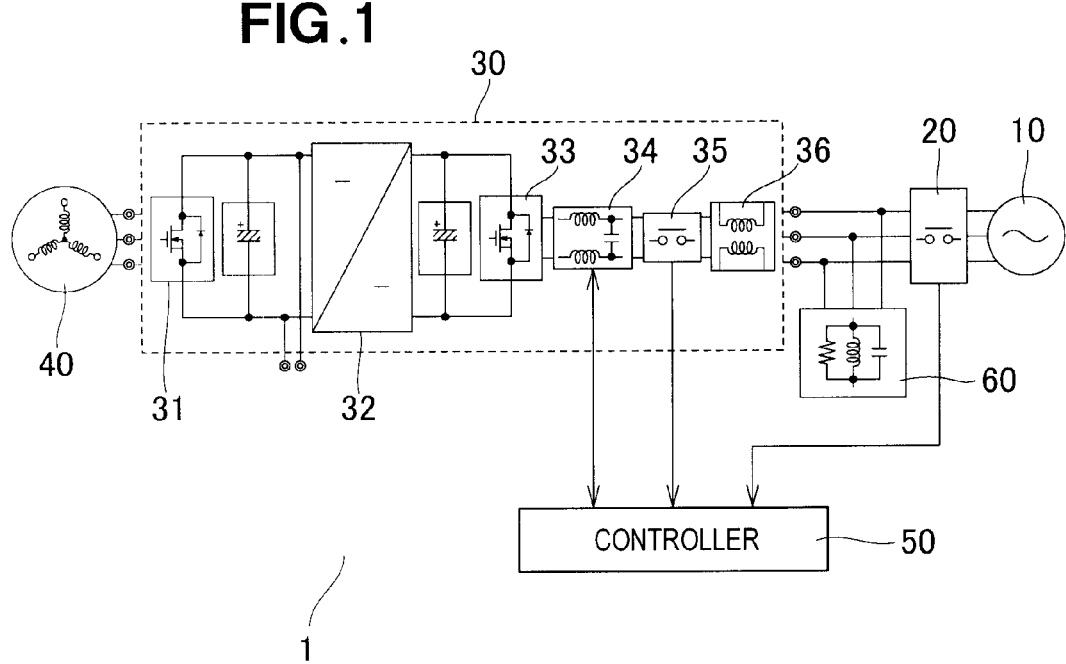
FIG. 1 is a block diagram showing the configuration of a system-interconnected inverter according to the present invention.

As shown in FIG. 1, a system-interconnected inverter 1 according to the present embodiment includes a system power source 10, a connection relay 20, an inverter section 30, an alternator 40, a controller 50, and a load 60.

The inverter section 30 includes a rectifier 31, a DC-DC converter 32, a FET bridge 33 an LC filter 34, a conversion relay 35, and a noise filter 36.

The alternator 40 converts the output from an engine into AC power and outputs the AC power to the rectifier 31 in the inverter section 30. The rectifier 31 converts the AC voltage outputted from the alternator 40 into a DC voltage and outputs the DC voltage to the DC-DC converter 32. The DC-DC converter 32 boosts the DC voltage outputted from the rectifier 31 and outputs the boosted DC voltage to the FET bridge 33.

The FET bridge 33 operates as switching means for converting the input DC voltage into a square-wave voltage by using pulse width modulation (PWM) and outputting the square-wave voltage to the LC filter 34.

The LC filter 34 converts the square-wave voltage outputted from the FET bridge 33 into a sinusoidal voltage and outputs the sinusoidal voltage to the conversion relay 35. The conversion relay 35 connects and disconnects the LC filter 34 to and from a system to output the sinusoidal voltage outputted from the LC filter 34 to the noise filter 36. The noise filter 36 removes noise from the input sinusoidal voltage and outputs the noise-free sinusoidal voltage of the same amplitude, frequency and phase as those of the system power source to the rectifier load 60.

The controller 50 is a program-controlled circuit that changes the duty value of the switching means (FET bridge 33) in accordance with the value obtained by dividing the maximum value by the effective value of the output current from the switching means measured when the system-interconnected inverter 1 is disconnected from the system power source 10.

Figure 2:
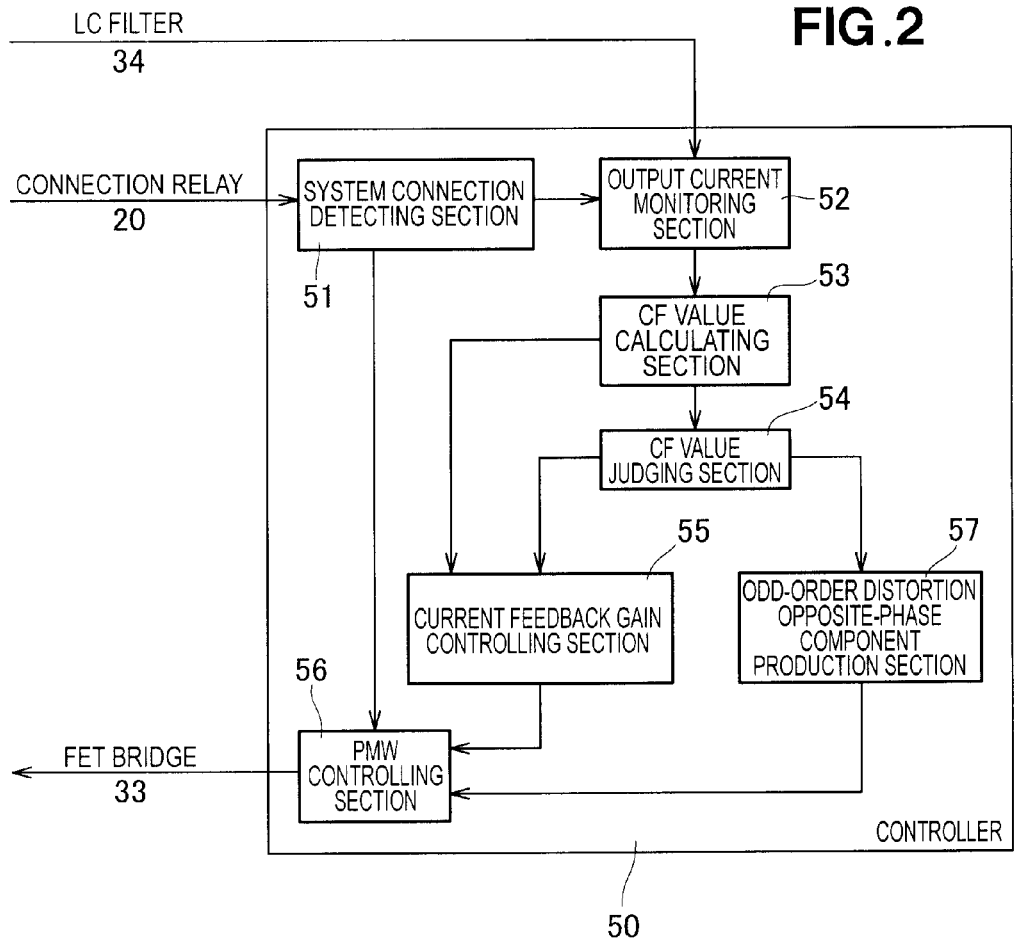
FIG. 2 is an electric block diagram showing an internal configuration of a controller shown in FIG. 1.

FIG. 2 shows a functional structure of a program executed by the controller 50. As shown in FIG. 2, the controller 50 includes a system connection detecting section 51, an output current monitoring section 52, a crest factor calculating section 53, a crest factor judging section 54, a current feedback gain controlling section 55, a pulse width modulation controlling section 56, and an odd-order distortion opposite-phase or antiphase component producing section 57.

Figure 3:
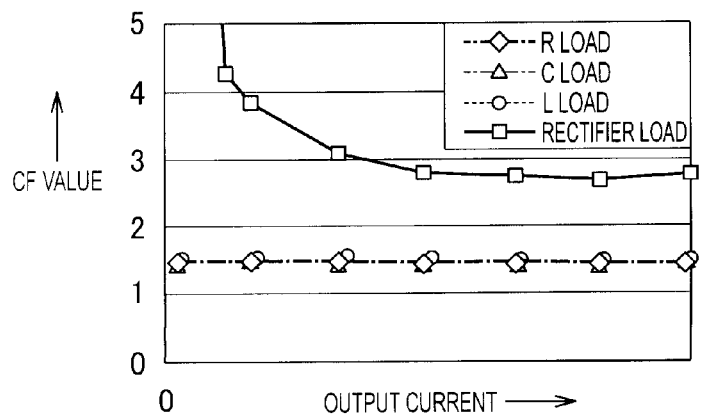
FIG. 3 is a graph showing a relationship between the output current and the CF value of the system-interconnected inverter of FIG. 1.
Figure 4:
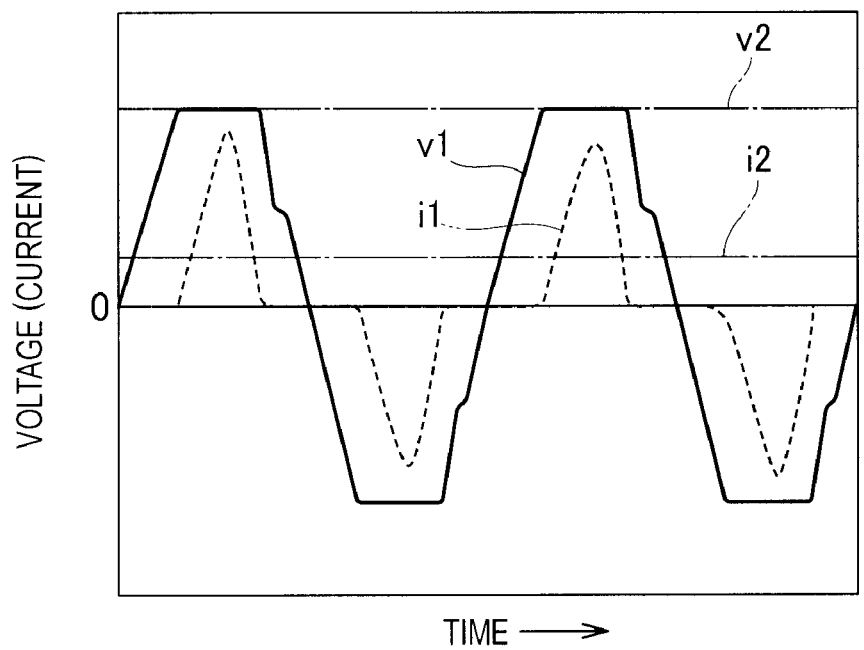
FIG. 4 is a view showing a voltage (current) waveform when a rectifier load is connected to the system-interconnected inverter of FIG. 1.
Figure 5:
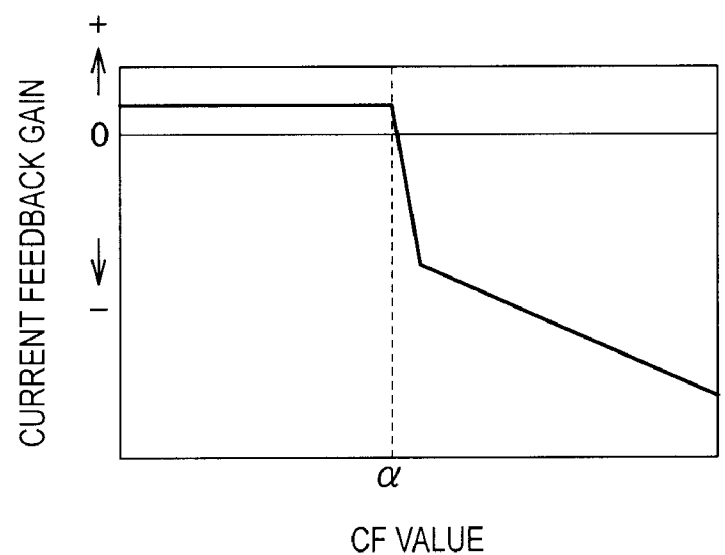
FIG. 5 is a graph showing a relationship between the CF value and the current feedback gain of the system-interconnected inverter of FIG. 1.
Figure 6:
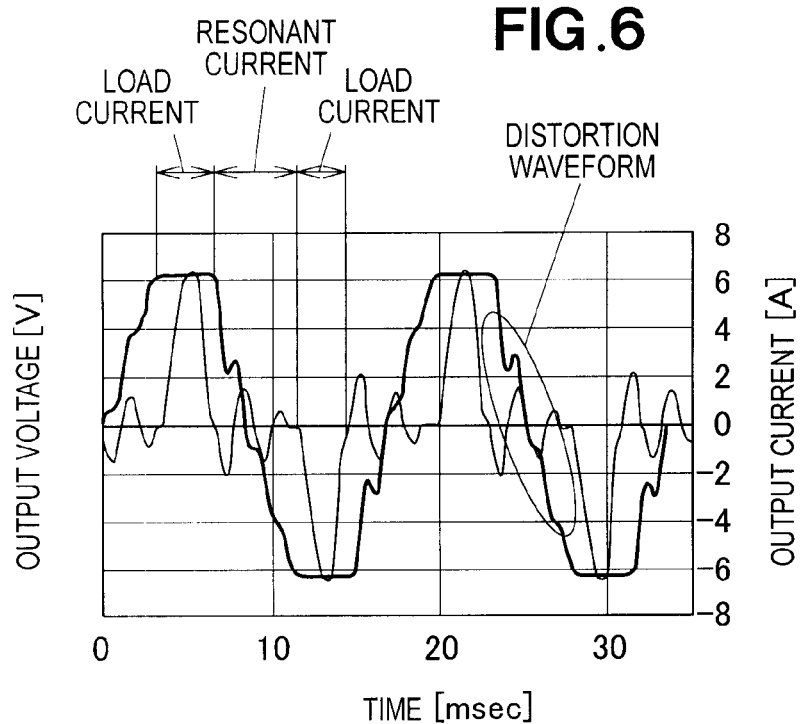
FIG. 6 is a view showing a damping current waveform obtained in the system-interconnected inverter of FIG. 1.
Figure 7:
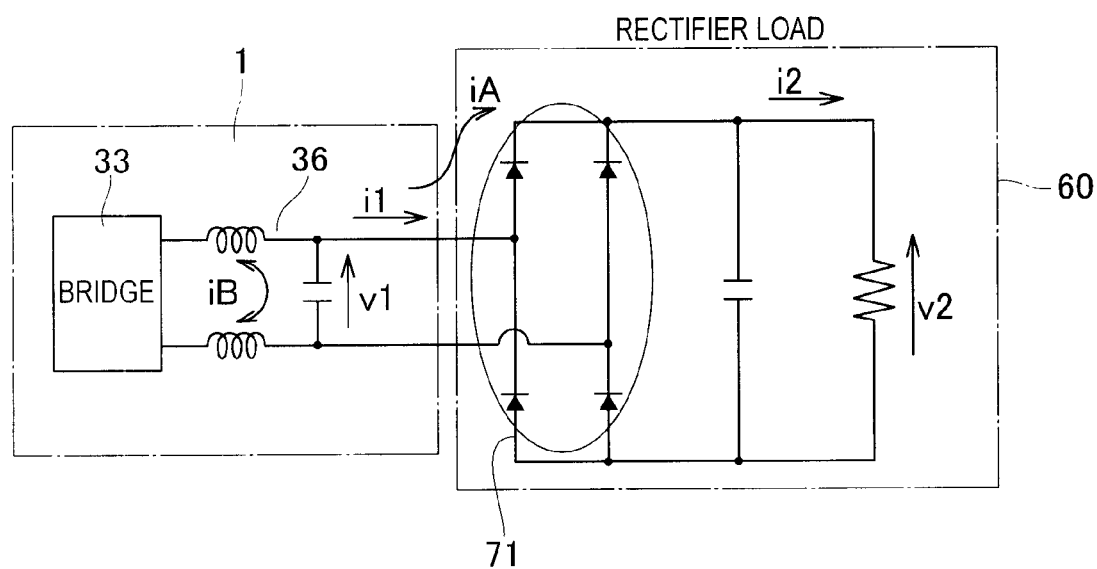
FIG. 7 is a view showing how the rear stage of an inverter section is connected to a rectifier load in the system-interconnected inverter of FIG. 1.

The functions of the above sections will be described below with reference to FIGS. 3 to 7. FIG. 3 shows the relationship between the output current and the CF value when the load 60 is connected. FIG. 4 shows current/voltage waveforms when a rectifier load is connected as the load 60. FIG. 5 shows the relationship between the CF value and the current feedback gain. FIG. 6 shows a current waveform containing harmonic distortion. FIG. 7 shows how the output stage of the inverter section 30 is connected to the rectifier load 60.

The system connection detecting section 51 judges whether or not the system-interconnected inverter 1 is disconnected from the system power source 10 and is performing a backup operation based on a signal from the connection relay 20 so as to control the output current monitoring section 52.

When the system connection detecting section 51 receives the signal indicating that the system-interconnected inverter 1 is disconnected from the system power source 10 and is performing a backup operation, the output current monitoring section 52 measures the current outputted from the FET bridge 33 via the LC filter 34 and forwards the measurement signal to the crest factor calculating section 53.

The crest factor calculating section 53 divides the maximum value of the output current from the FET bridge 33 by the effective value thereof ($1/\sqrt{2}$ of the peak value when the output current has a sinusoidal wave form). The value obtained by the division is referred to as a crest factor (hereinafter simply referred to as a CF value).

The CF value judging section 54 judges whether or not the CF value outputted from the CF value calculating section 53 exceeds a value indicating that the rectifier load 60 is connected; e.g., 1.8, so as to control the current feedback gain controlling section 55 and the odd-order distortion opposite-phase component producing section 57.

A supplementary description will be made of the CF value. According to the current/voltage waveforms shown in FIG. 4, the CF value is calculated by the following equation: the maximum value of a current waveform i1/an effective value i2 thereof. The relationship between the output current and the CF value shown in FIG. 3 indicates that the CF value is $\sqrt{2}$ when any of a resistance R load, a capacitance C load, and an inductance L load is connected, whereas the CF value exceeds 2.6 when a rectifier load is connected as the load 60. The current waveform i1 is a pulse-like waveform as shown in FIG. 4, resulting in a large CF value, which can be used to sense that a rectifier load is connected as the load 60. It is assumed in the present embodiment that the CF value judging section 54 judges that a rectifier load is connected as the load 60 when the CF value is greater than 1.8. The detail will be described later.

The current feedback gain controlling section 55 is controlled by the output from the CF value judging section 54 and sets the duty value used in PWM control performed by the pulse width modulation controlling section 56 based on the CF value calculated by the CF value calculating section 53. A positive current feedback gain is usually set. The reason for this is that since the output voltage decreases when a large amount of current flows, it is necessary to set a large duty value in the PWM control in order to correct the decrease in output voltage.

When the load 60 is judged to be a rectifier load, however, the current feedback gain controlling section 55 sets a negative current feedback gain in accordance with the graph shown in FIG. 5 representing the relationship between the current feedback gain and the CF value, and then PWM control is performed to reduce the amount of resonant current causing the harmonic distortion (damping voltage waveform) shown in FIG. 6.

When the control described above allows a load current to flow, the duty value used in the PWM is small, but the voltage waveform will not change (the voltage will not decrease) (*5). As shown in the configuration diagram showing how the rear stage of the inverter section 30 is connected to the rectifier load 60 in FIG. 7, when a load current i2 flows through the rectifier load 60, the following equation is satisfied: V1>V2+VF (VF denotes the bridge forward voltage of each diode). In this case, the capacitor in the rectifier load 60 is charged, resulting in voltage reduction and an output voltage waveform of V1=V2+VF. As a result, no adverse effect occurs because the voltage waveform is determined by V2 even when the duty value is reduced.

The odd-order distortion opposite-phase component producing section 57 produces a voltage waveform of an opposite-phase component whose amplitude is the same as that of an odd-order distortion component contained in the harmonic distortion, and superimposes the resulting opposite-phase component voltage waveform on the waveform of the output voltage from the FET bridge 33 to perform feedback control so that the square waveform approaches a sinusoidal waveform. To produce the opposite-phase component voltage waveform and superimpose it on the waveform of the output voltage from the FET bridge 33 to perform feedback control, e.g., an FIR (finite impulse response) filter is used. An impulse response from an FIR filter along with convolution operation is used to produce a voltage waveform having the same amplitude but having the opposite phase, which is then superimposed on the waveform of the output voltage from the FET bridge 33 to perform feedback control.

Figure 11:
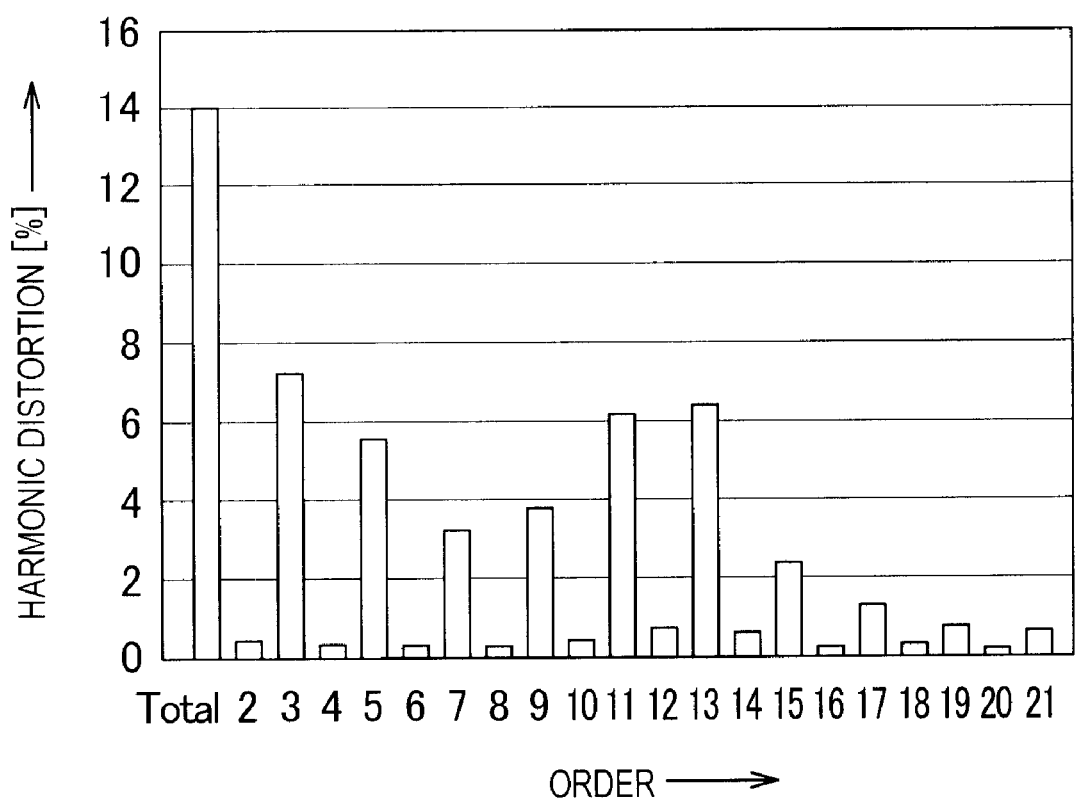
FIG. 11 is a graph showing harmonic distortion for various orders produced in the conventional system-interconnected inverter.

A supplementary description will be made of reduction in odd-order harmonic distortion. As shown in FIG. 4, according to the voltage (current) waveform obtained when a rectifier load is connected as the load 60 to the system-interconnected inverter 1 shown in FIG. 1, and assuming that voltages v1, v2 and currents i1, i2 are measured as parameters, the frequency of the output voltage v1 is 60 Hz, and the frequency of the oscillation waveform of the output voltage ranges from 600 to 800 Hz. It is therefore considered that the oscillation waveform is formed of the 11th-order (660 Hz=60 Hz×11) and 13th-order (780 Hz=60 Hz=13) harmonic waves. It is expected that reducing the amplitude of the oscillation waveform improves the 11th- and 13th-order harmonic distortion (FIG. 11).

In FIG. 7, during the period when current flows through the rectifier load connected as the load 60, the current flows along a path iA, whereas when no current flows through a diode bridge 71, the current flows along a path iB and is attenuated and oscillates at the resonant frequency of the LC filter 34. The reason is that the diode bridge 71 clamps the voltage waveform and then the output voltage has a square-wave form. It is conceivable that the resonant current causes the output voltage from the system-interconnected inverter 1 to oscillate, and the oscillating output voltage is the resonant voltage that appears on the output voltage in FIG. 6. In view of this fact, the present embodiment is configured in such a way that the odd-order distortion opposite-phase component producing section 57 produces a voltage waveform of an opposite-phase component of the odd-order distortion component contained in the output voltage from the LC filter 34, and the resulting opposite-phase component voltage waveform is used to perform feedback control so that the output voltage from the FET bridge 33 approaches a sinusoidal waveform from the square waveform.

The PWM controlling section 56 uses the output from the current feedback gain controlling section 55 and the output from the odd-order distortion opposite-phase component producing section 57 to perform PWM control on the FET bridge 33 in the inverter section 30.

Figure 8:
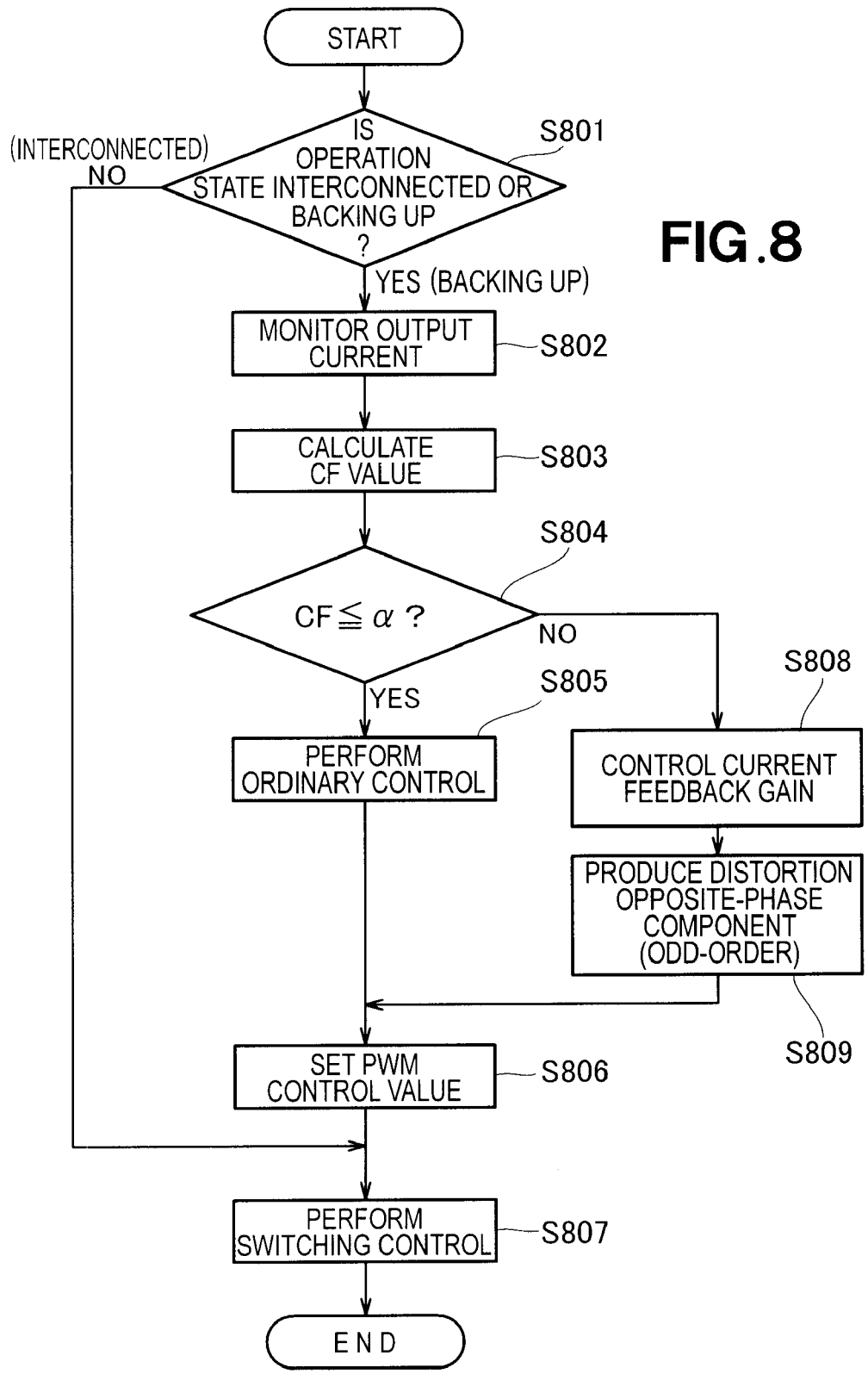
FIG. 8 is a flowchart showing an operation of the controller in the system-interconnected inverter of FIG. 1.
Figure 9:
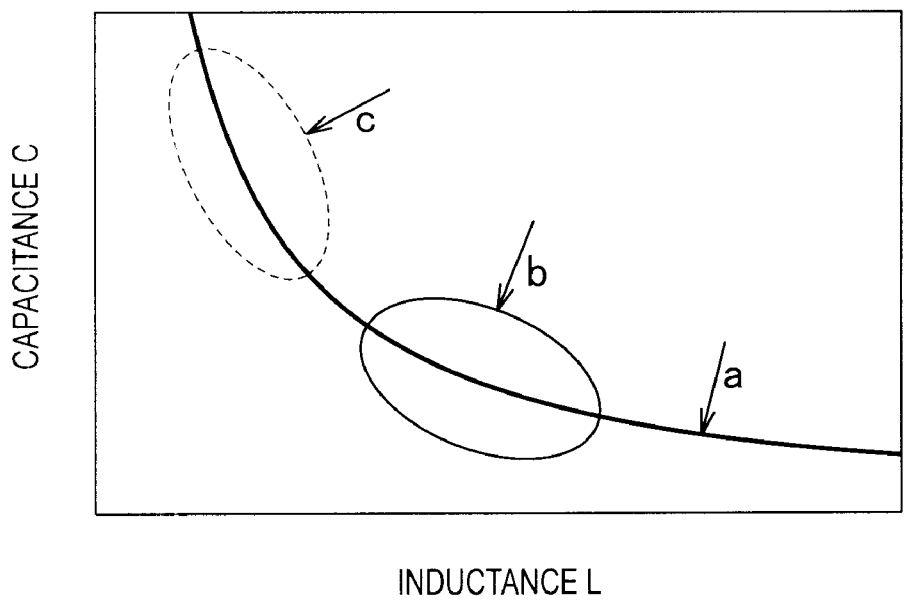
FIG. 9 is a schematic view showing the ranges of a LC filter constant required when a conventional system-interconnected inverter is interconnected with a system and when the system-interconnected inverter performs a backup operation.
Figure 10:
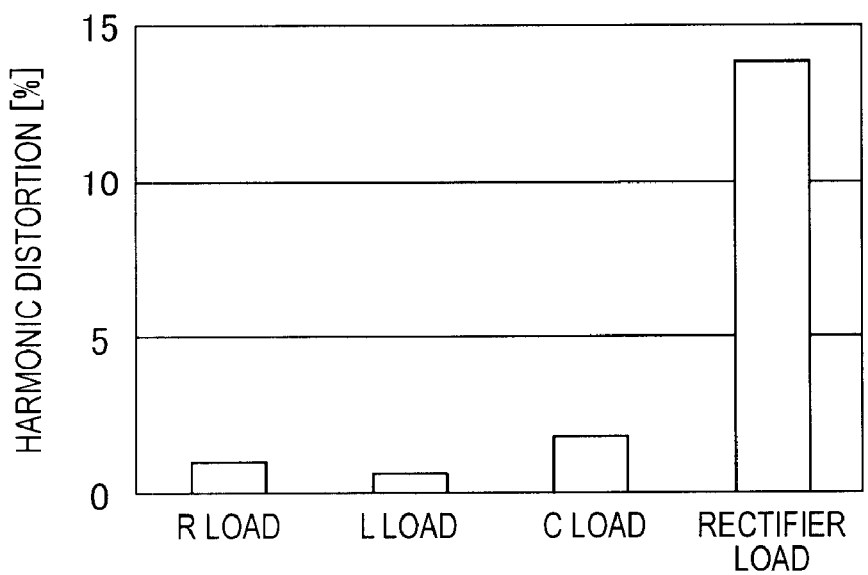
FIG. 10 is a view showing harmonic distortion of the output voltage from the conventional system-interconnected inverter at the time of backup operation.

FIG. 8 is a flowchart showing an operation of the controller 50 in the system-interconnected inverter 1 of the first embodiment according to the present invention. The operation of the controller 50 will be described in detail with reference to the flowchart shown in FIG. 8.

In the controller 50, the system connection detecting section 51 first receives a signal from the connection relay 20 and judges whether or not the system-interconnected inverter 1 is disconnected from the system power source 10 and is performing backup operation (step S801).

When the system-interconnected inverter 1 is operated in connection with the system power source 10 ("No (interconnected) in step S801", the PWM controlling section 56 controls the FET bridge 33 in the inverter section 30 to perform the switching control (step S807).

On the other hand, when receiving from the system connection detecting section 51 a signal indicating that the system-interconnected inverter 1 is disconnected from the system power source 10 and performing backup operation ("Yes (backing up)" in step S801), the output current monitoring section 52 monitors the current outputted from the FET bridge 33 via the LC filter 34 in the inverter section 30, and outputs the monitored result to the CF value calculating section 53 (step S802).

The CF value calculating section 53 calculates the CF value by dividing the maximum value by the effective value of the output current from the FET bridge 33 measured by the output current monitoring section 52 with the system-interconnected inverter 1 disconnected from the system power source 10, and outputs the calculated CF value to the CF value judging section 54 (step S803).

The CF value judging section 54 receives the CF value outputted from the CF value calculating section 53 and judges whether or not the CF value exceeds a value a indicating the rectifier load 60 is connected; e.g., 1.8 (step S804).

When the judgment result from the CF value judging section 54 shows that the CF value does not exceed a ("Yes" in step S804), the current feedback gain controlling section 55 performs an ordinary control (step S805), and sets a PWM control value (duty value) that allows a positive current feedback gain to be set (step S806). The PWM controlling section 56 receives the thus set PWM control value and controls the FET bridge 33 in the inverter section 30 to perform the switching control based on the thus set duty value (step S807).

On the other hand, when the judgment result from the CF value judging section 54 shows that the CF value exceeds α ("No" in step S804), the current feedback gain controlling section 55 recognizes that a rectifier load is connected as the load 60, and sets the PWM control value (duty value) that allows a negative current feedback gain to be set (step S808).

At this point, the odd-order distortion opposite-phase component producing section 57 is also activated. The odd-order distortion opposite-phase component producing section 57 produces a voltage waveform of an opposite-phase component whose amplitude is the same as that of the odd-order distortion component of the harmonic distortion contained in the voltage waveform outputted via the LC filter 34 (step S809), superimposes the resultant voltage waveform on the waveform of the output voltage from the FET bridge 33 to set the duty value (PWM control value), and performs feedback control via the PWM controlling section 56 so that the square waveform approaches a sinusoidal waveform (step S806). The PWM controlling section 56 controls the FET bridge 33 to perform the switching control based on the thus set duty value (step S807).

The description having been made is summarized as follows:

The controller 50 changes the duty value in accordance with the value (CF value) obtained by dividing the maximum value by the effective value of the output current from the FET bridge 33 in the system-interconnected inverter 1 measured with the system-interconnected inverter 1 disconnected from the system power source 10, whereby the harmonic distortion of the output voltage can be improved.

Further, when the value (CF value) obtained by dividing the maximum value by the effective value of the output current from the FET bridge 33 exceeds a predetermined value (1.8, for example) indicating connection of a load that produces a harmonic distortion whose magnitude is unacceptable in terms of output waveform (a rectifier load is connected as the load 60), the controller 50 sets the duty value of the FET bridge 33 at a value lower than that used when the system-interconnected inverter 1 is connected to the system power source 10, whereby PWM switching control that reduces the resonant current that causes the harmonic distortion can be performed.

Moreover, the controller 50 produces the opposite-phase component of an odd-order distortion component contained in the harmonic distortion and uses the resulting opposite-phase component to perform feedback control so that the output voltage from the FET bridge 33 approaches a sinusoidal waveform from a square waveform. The resulting feedback control allows the square waveform containing the odd-order harmonic component, which appears when the rectifier load 60 is connected and causes the crest of the output voltage to be flat, to approach a sinusoidal output waveform, whereby the harmonic distortion of the odd-order distortion component can be reduced.

The system-interconnected inverter of the present invention is preferably used, for example, with a small gas engine cogenerator that uses an inverter as an electricity generation unit to produce electricity in synchronization with a system power source and supplies the resulting electric power to domestic appliances. The present invention is also generally applicable to a system-interconnected inverter that operates in connection with a commercial power supply or a solar cell required regulating harmonic components of the output current in order to maintain high electric power quality.

Obviously, various minor changes and modifications of the present invention are possible in light of the above teaching. It is therefore to be understood that within the cope of the appended claims the invention may be practiced otherwise than as specifically described.

What is claimed is:

1. An inverter interconnected with a system power source for outputting AC power, comprising:
   switching means for turning on and off DC power based on a predetermined duty value and outputting a voltage whose frequency is the same as that of the system power source; and
   control means for controlling the switching means,
   wherein the control means changes the duty value of the switching means in accordance with a value obtained by dividing a maximum value by an effective value of an output current from the switching means measured with the system-interconnected inverter disconnected from the source of system power source;
   wherein, when the value obtained by dividing the maximum value by the effective value of the output current from the switching means exceeds a value indicating connection of a load that produces a harmonic distortion whose magnitude is substantially unacceptable in terms of output waveform, the control means sets the duty value of the switching means at a value lower than the value used when the system-interconnected inverter is connected to the source of system power source.

2. The inverter of claim 1, wherein the control means produces an opposite-phase component of an odd-order distortion component of the harmonic distortion contained in the waveform of an output voltage from the switching means, superimposes the opposite-phase component on the output voltage from the switching means, and performs feedback control so that the output voltage approaches a sinusoidal waveform.

* * * * *